(12) United States Patent
Zhang et al.

(10) Patent No.: US 9,070,034 B2
(45) Date of Patent: Jun. 30, 2015

(54) METHOD AND SYSTEM FOR CORRECTING QR CODE IMAGE

(71) Applicants: PEKING UNIVERSITY FOUNDER GROUP CO., LTD., Beijing (CN); FOUNDER MOBILE MEDIA TECHNOLOGY (BEIJING) CO., LTD., Beijing (CN)

(72) Inventors: Ling Zhang, Beijing (CN); Chao Guan, Beijing (CN); Zhenhua Liu, Beijing (CN); Gezhang Liu, Beijing (CN); Wanyi Che, Beijing (CN)

(73) Assignees: PEKING UNIVERSITY FOUNDER GROUP., LTD., Beijing (CN); FOUNDER MOBILE MEDIA TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/102,673

(22) Filed: Dec. 11, 2013

(65) Prior Publication Data

US 2015/0090794 A1    Apr. 2, 2015

(30) Foreign Application Priority Data

Sep. 29, 2013  (CN) .......................... 2013 1 0454928

(51) Int. Cl.
G06K 7/10      (2006.01)
G06K 7/14      (2006.01)
G06K 19/06     (2006.01)

(52) U.S. Cl.
CPC ............ G06K 7/1456 (2013.01); G06K 7/1417 (2013.01); G06K 19/06037 (2013.01); G06K 7/1439 (2013.01)

(58) Field of Classification Search
USPC ........................................ 235/462.09–462.11
See application file for complete search history.

(56) References Cited

U.S. PATENT DOCUMENTS

| | | | |
|---|---|---|---|
| 7,546,950 B2 * | 6/2009 | Thiyagarajah | ........... 235/462.09 |
| 2011/0101101 A1 * | 5/2011 | Ye et al. | ................... 235/462.11 |
| 2011/0290878 A1 * | 12/2011 | Sun et al. | ....................... 235/437 |
| 2011/0290879 A1 * | 12/2011 | Guo et al. | ..................... 235/437 |

* cited by examiner

*Primary Examiner* — Christle I Marshall
(74) *Attorney, Agent, or Firm* — Brinks Gilson & Lione; Lawrence G. Almeda

(57) ABSTRACT

Method and system for correcting a QR code image is provided. An initial coordination system and a correction coordination system are determined at first. Conversion coefficients are obtained according to the coordinates of the central point of each detection pattern, the coordinates of the locating point in the initial coordinate system, the correction coordinate system. For each point in the correction coordinate system, its corresponding module in the initial coordinate system is found out, and the grayscale value of that module is assigned to the point to realize the correction of the QR code image. Coordinates of the three detection patterns, the locating point in the initial coordination system, and the correction coordinate system may be readily obtained according to different version numbers. At the same time, shortcomings caused by edge detection may be avoided, and a favorable correction effect may be obtained.

15 Claims, 6 Drawing Sheets

METHOD AND SYSTEM FOR CORRECTING QR CODE IMAGE

CROSS-REFERENCE TO RELATED APPLICATIONS

This application claims priority to Chinese Patent Application No. 201310454928.2, filed on Sep. 29, 2013 and entitled "METHOD AND SYSTEM FOR CORRECTING QR CODE IMAGE", which is incorporated herein by reference in its entirety.

FIELD OF THE INVENTION

The present invention relates to the field of image location detection and sample correction techniques, and more particular, to a method and system for correcting a QR code image.

DESCRIPTION OF THE RELATED ART

QR code is one kind of two dimensional (2D) codes, which has gained wider and wider applications due to advantages of fast reading speed, high data intensity and small footprints. However, in practical applications, in the acquisition of QR code image data, geometric distortions may be present in photographed QR code images due to their shooting angles, bended images, and differences in the imaging devices. A QR code image is originally a square. However, a photographed QR code image may be distorted into a trapezium. QR code images with geometric distortions may cause perceptible difficulties to the locating and orienting of QR code images, as well as their sampling and recognition, making it difficult to decode code information with a decoding algorithm. Thus, it is necessary to correct a distorted QR code image.

Because QR code images are shot with shorter object distances, an apparent perspective phenomenon may be observed. Thus, a perspective transformation must be performed on a photographed QR code image. The so-called perspective transformation means converting each coordinate in a current coordinate system of the QR code image to a correction coordinate system and obtain corrected coordinates. It is necessary to obtain precise perspective conversion coefficients to realize the perspective transformation process. In general, perspective conversion coefficients are obtained through computation based on centre coordinates of four points in a QR code. Each coordinate in the QR code image may be converted to a correction coordinate according to the perspective conversion coefficients. In the prior art, coordinates of four corners of a QR code image are selected as references in the perspective transformation, which generally comprises steps: (1) obtaining four edges of a QR code image by a edge detection method; (2) determining three sets of points of detection patterns by horizontal scan and vertical scan; (3) obtaining fitted lines on the four edges with the RANSAC algorithm, wherein the intersecting points of the four fitted lines are four corners of the QR code; (4) obtaining perspective conversion coefficients using the coordinates of the four corners. However, in general, QR code images with interference have irregular edges and poor definition, leading to a low degree of accuracy in the process of obtaining edges of a QR code image through edge detection, with larger errors in the obtained coordinates of the four corners, which may further affect the accuracy of the perspective conversion coefficients and result in unfavourable correction effect of the QR code image.

SUMMARY OF THE INVENTION

Thus, a method and system for correcting a QR code image is provided in this invention to solve the technical problem in the prior art of unable to obtain a favourable correction effect.

In order to solve the above problems, this invention is implemented by the following technical solutions.

A method for correcting a QR code image, comprising the following steps:

determining an initial coordination system where the QR code image locates and a correction coordination system where a corrected image locates, wherein each point in the correction coordination system corresponds to a point in the initial coordination system;

obtaining coordinates of a central point of each detection pattern and a locating point in the initial coordinate system and the correction coordinate system respectively;

obtaining conversion coefficients according to the coordinates of the central point of each detection pattern and the coordinates of the locating point in the initial coordinate system and the correction coordinate system;

finding out, for each point in the correction coordinate system, a module of the QR code image in which its corresponding point in the initial coordinate system locates according to the conversion coefficients, and assigning the grayscale value of that module to the point to realize the correction of the QR code image.

Further, in the process of finding out, for each point in the correction coordinate system, a module of the QR code image in which its corresponding point in the initial coordinate system locates according to the conversion coefficients, and assigning the grayscale value of that module to the point to realize the correction of the QR code image:

the grayscale value of the module is the grayscale value of the central pixel of the module.

Further, in the process of obtaining conversion coefficients according to the coordinates of the central point of each detection pattern and the coordinates of the locating point in the initial coordinate system and the correction coordinate system:

the conversion coefficients are obtained following a rule of perspective transformation.

Further, the central point of a correction pattern is selected as the locating point.

Further, the process of obtaining coordinates of the central point of each detection pattern and the locating point in the initial coordinate system comprises:

determining coordinates of the central point of each detection pattern in the initial coordination system;

obtaining coordinates of the central point of the correction pattern in the initial coordination system, according to the relative location relationship between the central point of the correction pattern and the central points of the detection patterns.

Further, the process of obtaining reference coordinates of the central point of the correction pattern in the initial coordination system according to the relative location relationship between the central point of the correction pattern and the central points of the detection patterns comprises:

obtaining coordinates $(X_A, Y_A)$ of the central point of a first detection pattern in the initial coordination system; obtaining a horizontal coordinate of the central point of the correction pattern, according to the horizontal distance between central point of the correction pattern and the central point of the first detection pattern; obtaining a vertical coordinate of the central point of the correction pattern, according to the vertical distance between central point of the correction pattern and the central point of the first detection pattern.

Further, the horizontal distance and the vertical distance are determined according to the following equations:

the horizontal distance is $\epsilon_h=\epsilon(X_R-X_A)$ the vertical distance is $\epsilon_z=\epsilon(Y_R-Y_A)$ wherein, $X_R=X_B-X_A+X_C, Y_R=Y_B-Y_A+Y_C$, $(X_B,Y_B)$ is the coordinates of the central point of the second detection pattern; $(X_C,Y_C)$ is the coordinates of the central point of the third detection pattern; $\epsilon$ is an offset factor of the correction pattern, and $\epsilon=(N-3)/N$, N is the number of modules contained in the QR code in the horizontal or vertical direction.

Further, the process of obtaining coordinates of the central point of each detection pattern and the locating point in the correction coordinate system comprises:

determining coordinates of the central point of the detection pattern in the correction coordinate system, according to the number of modules in a standard QR code image between the central point of each detection pattern and an edge of the QR code image;

determining coordinates of the central point of the correction pattern in the correction coordinate system, according to the number of modules in a standard QR code image between the central point of the correction pattern and an edge of the QR code image.

A system for correcting a QR code image, comprising:

a coordinate system determination module, for determining an initial coordination system where the QR code image locates and a correction coordination system where a corrected image locates, wherein each point in the correction coordination system corresponds to a point in the initial coordination system;

a coordinate obtaining module, for obtaining coordinates of a central point of each detection pattern and a locating point in the initial coordinate system and the correction coordinate system respectively;

a conversion coefficient obtaining module, for obtaining conversion coefficients according to the coordinates of the central point of each detection pattern and the coordinates of the locating point in the initial coordinate system and the correction coordinate system;

a correction module, for finding out, for each point in the correction coordinate system, a module of the QR code image in which its corresponding point in the initial coordinate system locates according to the conversion coefficients, and assigning the grayscale value of that module to the point to realize the correction of the QR code image.

Further, the correction module is configured to set the grayscale value of the module as the grayscale value of the central pixel of the module.

Further, in the conversion coefficient obtaining module, the conversion coefficients are obtained following a rule of perspective transformation The coordinate obtaining module comprises:

a detection pattern coordinate obtaining unit, for determining coordinates of the central point of each detection pattern in the initial coordination system;

a correction pattern coordinate obtaining unit, for obtaining coordinates of the central point of the correction pattern in the initial coordination system, according to the relative location relationship between the central point of the correction pattern and the central points of the detection patterns.

Further, in the coordinate obtaining module, the central point of a correction pattern is selected as the locating point.

Further, the detection pattern coordinate obtaining unit comprises:

a first detection pattern coordinate obtaining sub-module, for obtaining coordinates $(X_A, Y_A)$ of the central point of a first detection pattern in the initial coordination system;

a correction pattern central point coordinate obtaining sub-module, for obtaining a horizontal coordinate of the central point of the correction pattern, according to the horizontal distance between central point of the correction pattern and the central point of the first detection pattern; obtaining a vertical coordinate of the central point of the correction pattern, according to the vertical distance between central point of the correction pattern and the central point of the first detection pattern.

Further, the correction pattern central point coordinate obtaining sub-module determines the horizontal coordinate and the vertical coordinate according to the following equations:

the horizontal distance is $\epsilon_h=\epsilon(X_R-X_A)$ the vertical distance is $\epsilon_z=\epsilon(Y_R-Y_A)$ wherein, $X_R=X_B-X_A+X_C, Y_R=Y_B-Y_A+Y_C$, $(X_B,Y_B)$ is the coordinates of the central point of the second detection pattern; $(X_C,Y_C)$ is the coordinates of the central point of the third detection pattern; $\epsilon$ is an offset factor of the correction pattern, and $\epsilon=(N-3)/N$, N is the number of modules contained in the QR code in the horizontal or vertical direction.

The correction pattern coordinate obtaining unit further comprises:

a detection pattern correction coordinate obtaining sub-module, for determining coordinates of the central point of the detection pattern in the correction coordinate system, according to the number of modules in a standard QR code image between the central point of each detection pattern and an edge of the QR code image;

a correction pattern correction coordinate obtaining sub-module, for determining coordinates of the central point of the correction pattern in the correction coordinate system, according to the number of modules in a standard QR code image between the central point of the correction pattern and an edge of the QR code image.

The above technical solutions of this invention have the following advantages over the prior art:

(1) In the method and system for correcting a QR code image of this invention, conversion coefficients are directly obtained by using three detection patterns and a locating point without edge detection. Because the detection patterns and locating point may be detected using relatively mature detection techniques with high detection accuracy, coordinates of the three detection patterns and the locating point in the initial coordination system and the correction coordinate system may be readily obtained according to different version numbers. The computation is simple and fast with less memory consumption. At the same time, shortcomings caused by edge detection may be avoided appropriately, and a favourable correction effect may be obtained.

(2) In the method and system for correcting a QR code image of this invention, in order to further reduce the amount of computation, in the acquisition of the grayscale value of a module, the pixel value of the central point of the module may be directly used as the grayscale value of the module. Because each module is the smallest image unit in a QR code image, which has a very small size, and very small difference in grayscale values of all pixels contained therein with respect to the entire QR code image, selecting the grayscale value of a pixel therein as a representative will not introduce errors, which may still ensure the accuracy of the correction, greatly lower the amount of computation, and improve correction efficiency.

(3) In the method and system for correcting a QR code image of this invention, the conversion coefficients are obtained according to a rule of perspective transformation. Perspective transformation has mature applications in the field of image correction, for which high accuracy may be achieved.

(4) The method and system for correcting a QR code image of this invention take full advantage of the characteristic of the detection patterns and the correction pattern themselves and the location relationship therebetween to greatly save detection steps, resulting in a simplified detection procedure and improved computing speed, so that fast detection may be realized for the detection patterns and correction pattern of the QR code image, at the same time, the correction speed of the QR code image may be improved accordingly.

BRIEF DESCRIPTION OF THE DRAWINGS

For a clear understanding of the content of this invention, this invention will be further described according to particular embodiments in reference to drawings.

Figure 1:
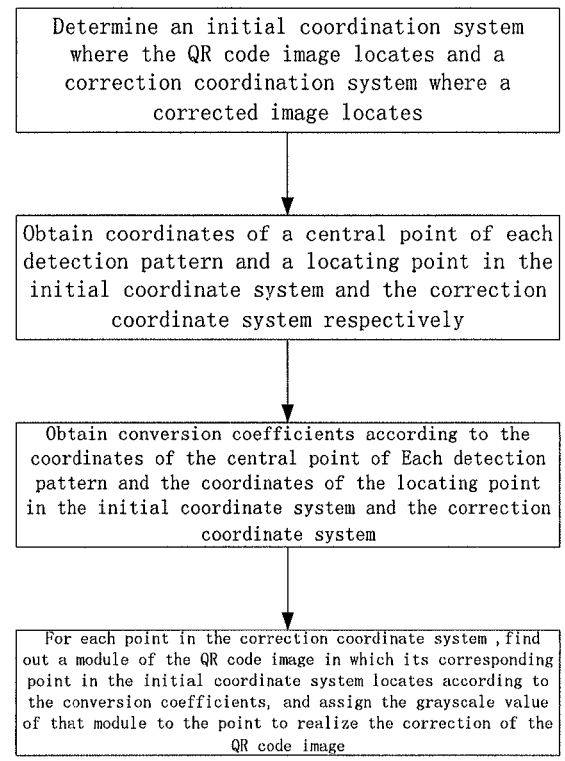
FIG. 1 is a flowchart of a method for correcting a QR code image according to this invention.

Labels in the drawings: 0—upper left detection pattern, 1—upper right detection pattern, 2—locating point, 3—lower left detection pattern.

DESCRIPTION OF THE EMBODIMENTS

Embodiment 1

A method for correcting a QR code image is provided in this embodiment, which as shown in FIG. 1 comprises the following steps:

determining an initial coordination system where the QR code image locates and a correction coordination system where a corrected image locates, wherein each point in the correction coordination system corresponds to a point in the initial coordination system;

obtaining coordinates of a central point of each detection pattern and a locating point in the initial coordinate system and the correction coordinate system respectively;

obtaining conversion coefficients according to the coordinates of the central point of each detection pattern and the coordinates of the locating point in the initial coordinate system and the correction coordinate system;

finding out, for each point in the correction coordinate system, a module of the QR code image in which its corresponding point in the initial coordinate system locates according to the conversion coefficients, and assigning the grayscale value of that module to the point to realize the correction of the QR code image.

As well known, the decoding process of a QR code image is performed based on a standard code image. The purpose of correcting a QR code image is to correct an image with a certain degree of skewing, damage, or distortion to obtain a standard image and make sure that a later decoding process may be performed on the entire QR code image successfully. Thus, in the correction of the QR code image in this embodiment, first of all, two coordinate systems are determined.

Figures 2, 3:
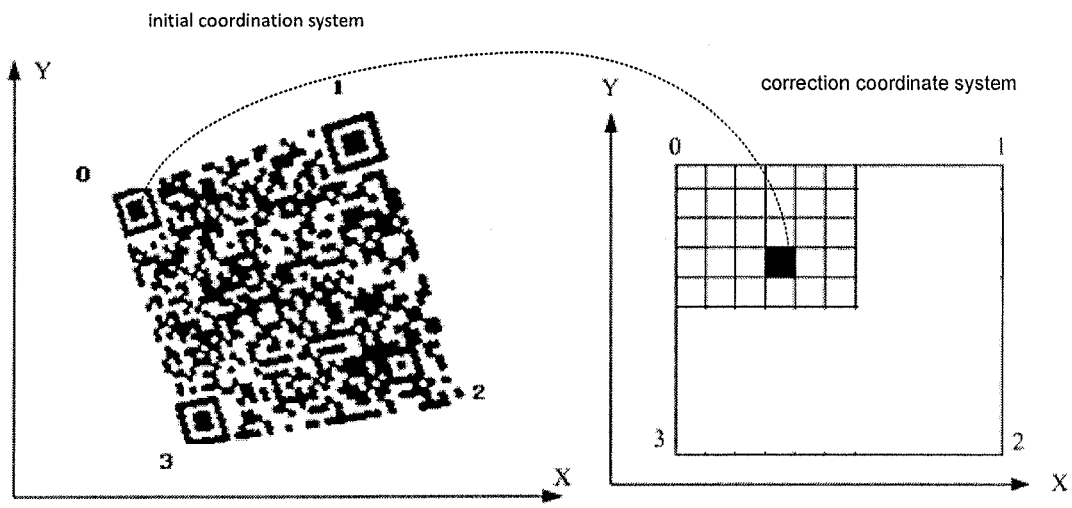
FIG. 2 is an initial coordination system of the QR code image.
FIG. 3 is a correction coordinate system of the QR code image.
Figure 4:
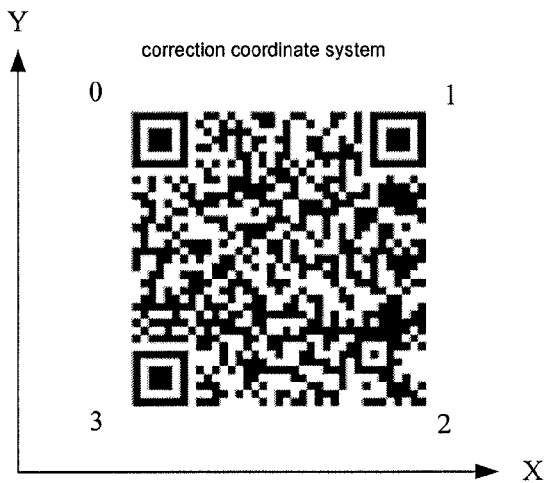
FIG. 4 is an effect diagram after correction and assignment according to an embodiment.
Figure 5:
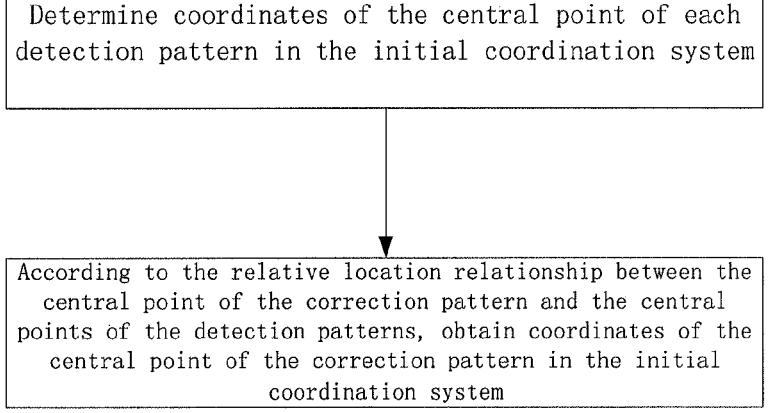
FIG. 5 is a flowchart of obtaining coordinates of the central point of each detection pattern and a locating point in the initial coordination system according to an embodiment.

An initial coordinate system where the QR code image locates is shown in FIG. 2, through detecting in this image, coordinates of a corresponding point may be obtained. FIG. 3 shows a correction coordinate system where a corrected image locates, wherein each square represents a point, and not all the points are shown in this figure, wherein the number of points is equal to the number of modules in the QR code image. In the two figures, 0 corresponds to a detection pattern on the upper left corner, 1 corresponds to a detection pattern on the upper right corner, 2 corresponds to a locating point, and 3 corresponds to a detection pattern on the lower left corner. As shown in FIG. 3, after the QR code is corrected, the centre of the detection pattern on the upper left corner is separate from the upper edge of the QR code by 4 modules and from the left edge by 4 modules. Thus, a point on row 4 column 4 in the correction coordinate system corresponds to the central point of the upper left detection pattern of the QR code image in the initial coordinate system. If the grayscale value of this point is 0, the grayscale value of the point on row 4 column 4 in the correction coordinate system is also 0; if the grayscale value of this point is 255, the grayscale value of the point on row 4 column 4 in the correction coordinate system is also 255. In this embodiment, the central point of the detection pattern must be black, and thus the corresponding point on row 4 column 4 in the correction coordinate system is also black. And so on, a grayscale value may be obtained for each point in the correction coordinate system according to the above operation, after which a corrected QR code image shown in FIG. 4 is obtained.

Steps of deriving conversion coefficients will be particularly described with equations below. Assume that the coordinates of three detection patterns and a locating point before the correction are P0(x0p,y0p), P1(x1p,y1p), P2(x2p,y2p), P3(x3p,y3p), and coordinates of the three detection patterns and the locating point after the correction are A0(x0,y0), A1(x1,y1), A2(x2,y2), A3 (x3,y3).

Coefficients are calculated according to the coordinates of the three detection patterns and the locating point after the correction:

$$dy2=y3-y2$$

$$dy3=y0-y1+y2-y3$$

If dy2=0 and dy3=0 wherein, dy2=0 means a vertical distance between the locating point and the lower left detection pattern is 0, i.e., they are both on the same line.

If dy3=0, it means that the vertical distance between the upper left detection pattern and the upper right detection pattern is equal to the vertical distance between the lower left detection pattern and the locating point, but in a reverse direction.

In this situation:

$$\begin{cases} a_{11} = x1 - x0 \\ a_{21} = x2 - x1 \\ a_{31} = x0 \\ a_{12} = y1 - y0 \\ a_{22} = y2 - y1 \\ a_{32} = y0 \\ a_{13} = 0 \\ a_{23} = 0 \\ a_{33} = 1 \end{cases}$$

Otherwise:

$$\begin{cases} a_{11} = x1 - x0 + a_{13}x1 \\ a_{21} = x3 - x0 + a_{23}x3 \\ a_{31} = x0 \\ a_{12} = y1 - y0 + a_{13}y1 \\ a_{22} = y2 - y1 + a_{23}y3 \\ a_{32} = y0 \\ a_{13} = a_{31} \\ a_{23} = a_{32} \\ a_{33} = 1 \end{cases}$$

Wherein:

$dx1 = x1 - x2$ $dx2 = x3 - x2$ $dx3 = x0 - x1 + x2 - x3$ $dy1 = y1 - y2$ $a13 = \dfrac{dx3 \cdot dy2 - dx2 \cdot dy3}{dx1 \cdot dy2 - dx2 \cdot dy1}$ $a31 = \dfrac{dx1 \cdot dy3 - dx3 \cdot dy1}{dx1 \cdot dy2 - dx2 \cdot dy1}$ Similarly, according to the above equations, corresponding coefficients $b_{11}$, $b_{21}$, $b_{31}$, $b_{12}$, $b_{22}$, $b_{32}$, $b_{13}$, $b_{23}$, $b_{33}$ may be derived by substituting the coordinates of the three detection patterns and the locating point before the correction into the above equations.

$$\begin{cases} b'_{11} = b_{22} \cdot b_{33} - b_{23} \cdot b_{32} \\ b'_{21} = b_{23} \cdot b_{31} - b_{21} \cdot b_{33} \\ b'_{31} = b_{21} \cdot b_{32} - b_{22} \cdot b_{31} \\ b'_{12} = b_{13} \cdot b_{32} - b_{12} \cdot b_{33} \\ b'_{22} = b_{11} \cdot b_{33} - b_{13} \cdot b_{31} \\ b'_{32} = b_{12} \cdot b_{31} - b_{11} \cdot b_{32} \\ b'_{13} = b_{12} \cdot b_{23} - b_{13} \cdot b_{22} \\ b'_{23} = b_{13} \cdot b_{21} - b_{11} \cdot b_{23} \\ b'_{33} = b_{11} \cdot b_{22} - b_{12} \cdot b_{21} \end{cases}$$

Finally, conversion coefficient C between the images before and after the conversion are calculated from the two sets of parameters $a_{11}, a_{21}, \ldots, a_{33}$ and $b_{11}', b_{21}', \ldots, b_{33}'$:

$$C = \begin{pmatrix} c_{11} & c_{12} & c_{13} \\ c_{21} & c_{22} & c_{23} \\ c_{31} & c_{32} & c_{33} \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} b'_{11} & b'_{12} & b'_{13} \\ b'_{21} & b'_{22} & b'_{23} \\ b'_{31} & b'_{32} & b'_{33} \end{pmatrix}$$

Given that each row and each column of the QR code both contains n modules, the correction coordinate system comprises n×n points. For the $i^{th}$ point $P_i(x_i, y_i)$, coordinates of a point corresponding to this point in the original image may be calculated with the following equations:

$$x'_i = \frac{c_{11}x_i + c_{21}y_i + c_{31}}{c_{13}x_i + c_{23}y_i + c_{33}}$$

$$y'_i = \frac{c_{12}x_i + c_{22}y_i + c_{32}}{c_{13}x_i + c_{23}y_i + c_{33}}$$

By assigning each module's grayscale value in the initial coordinate system to the correction coordinate system correspondingly, the correction process may be realized. FIG. 4 shows an effect diagram after correction and assignment. In the step of obtaining a corrected result, the grayscale value of a module is the grayscale value of a central pixel of the module. In order to further reduce the amount of computation, in the acquisition of the grayscale value of a module, the pixel value of the central point of the module may be directly used as the grayscale value of the module. Because each module is the smallest image unit in a QR code image, which has a very small size with respect to the entire QR code image, and very small difference in grayscale values of all pixels contained therein, selecting the pixel value of a pixel therein as a representative will introduce no errors, which may still ensure the accuracy of the correction, greatly lower the amount of computation, and improve correction efficiency.

The locating point of this embodiment may be the central point of a correction pattern or a point on the lower right corner. In case the locating point is at the lower right corner, a point corresponding to virtual detection patterns is selected. A point corresponding to virtual detection patterns means a point meeting the following conditions: its horizontal distance to the lower left detection pattern is equal to the horizontal distance between the upper right detection pattern and the upper left detection pattern; its vertical distance to the upper right detection pattern is equal to the vertical distance between the lower left detection pattern and the upper left detection pattern.

The locating point is preferably the central point of a correction pattern. Because some QR code image versions do not have a correction pattern provided, such as QR code images of version 1. In other situations, for example, serious distortions may cause the absence of a correction pattern, or the correction pattern cannot be detected successfully as limited by the detection technique employed. Replacing the correction pattern by a point on the lower right corner may achieve a good detection effect.

The method for correcting QR code image of this embodiment does not need edge detection, and may obtain conversion coefficients directly using three detection patterns and a locating point. Because the detection patterns and the locating point may be detected using relatively mature detection techniques with high detection accuracy, coordinates of the three detection patterns and the locating point in the initial coordination system and the correction coordinate system may be readily obtained according to different version numbers. Shortcomings caused by edge detection algorithm may be avoided appropriately, and a favourable correction effect may be obtained.

Embodiment 2

This embodiment comprises improvements made based on embodiment 1, wherein the process of obtaining coordinates of the central point of each detection pattern and a locating point in the initial coordinate system comprises:

determining coordinates of the central point of each detection pattern in the initial coordination system;

obtaining coordinates of the central point of the correction pattern in the initial coordination system, according to the relative location relationship between the central point of the correction pattern and the central points of the detection patterns.

Because QR code images are shot with short object distances, an apparent perspective phenomenon may be observed. Thus, a perspective transformation must be performed on a photographed QR code image. The so-called perspective transformation means converting each coordinate of the QR code image from a current coordinate system to a correction coordinate system and obtain corrected coordinates. It is necessary to obtain precise perspective conversion coefficients to realize the perspective transformation process. Conversion coefficients may be obtained in this embodiment by calculation based on the detection patterns and the correction pattern that are detected appropriately. Different from the calculation in the prior art in which four points on the edges of the QR code image are used, the problem of low correction accuracy caused by edge detection may be avoided.

Figure 6:
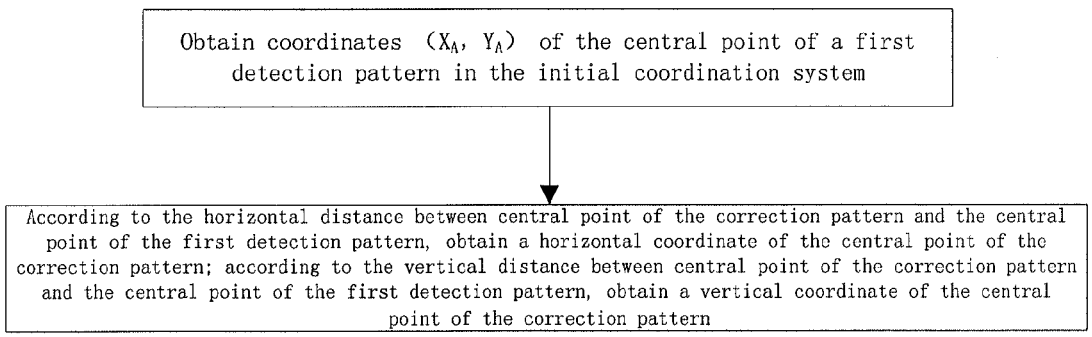
FIG. 6 is a flowchart of obtaining reference coordinates of the central point of a correction pattern in the initial coordination system according to an embodiment.

As shown in FIG. 6, the process of obtaining reference coordinates of the central point of the correction pattern in the initial coordination system according to the relative location relationship between the central point of the correction pattern and the central points of the detection patterns comprises:

obtaining coordinates $(X_A, Y_A)$ of the central point of a first detection pattern in the initial coordination system;

obtaining a horizontal coordinate of the central point of the correction pattern, according to the horizontal distance between central point of the correction pattern and the central point of the first detection pattern; obtaining a vertical coordinate of the central point of the correction pattern, according to the vertical distance between central point of the correction pattern and the central point of the first detection pattern.

Figure 7:
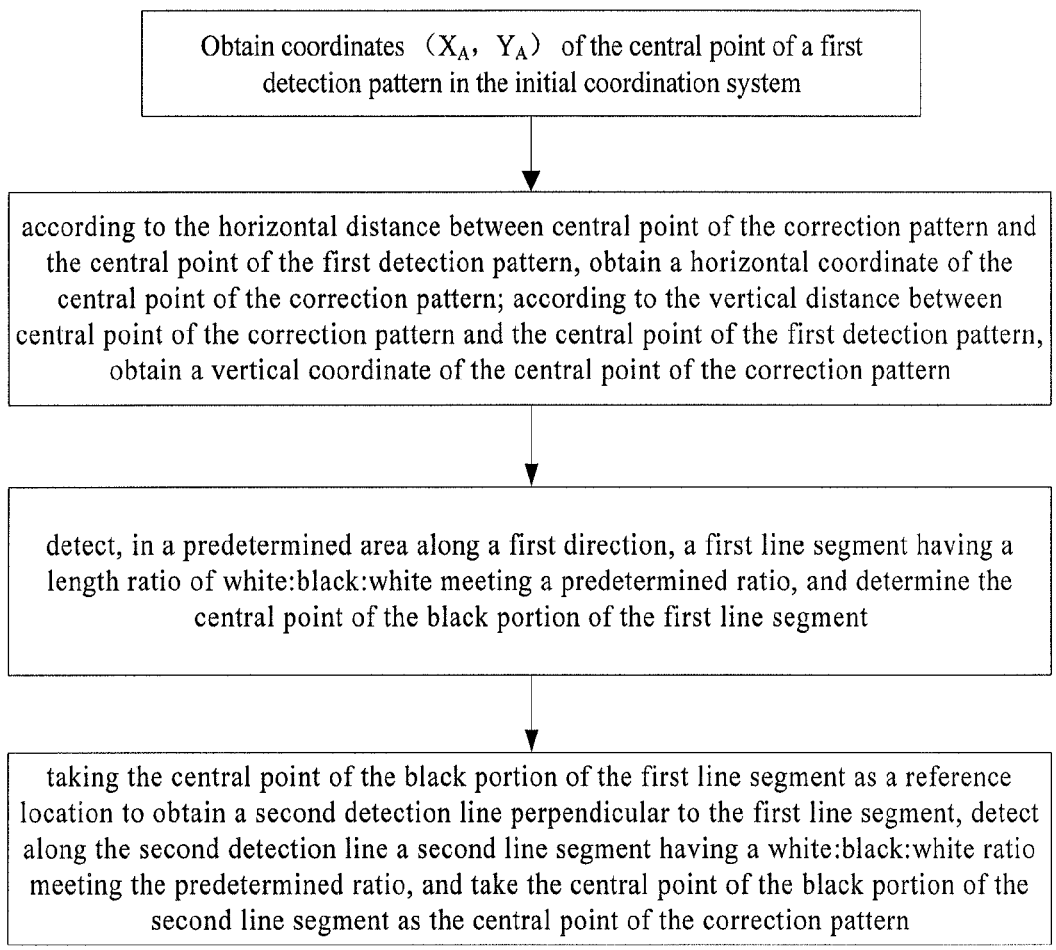
FIG. 7 is a flowchart of a precise locating process according to an embodiment.

The horizontal distance and the vertical distance are determined according to the following equations:

$$\text{the horizontal distance is } \epsilon_h = \epsilon(X_R - X_A)$$

$$\text{the vertical distance is } \epsilon_z = \epsilon(Y_R - Y_A)$$

wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/N$, N is the number of modules contained in the QR code in the horizontal or vertical direction. Thereby, the horizontal coordinate of the central point of the correction pattern is $X_A + \epsilon_h$, and the vertical coordinate of the central point of the correction pattern is $Y_A + \epsilon_z$. However, the accuracy of the coordinates of the correction pattern may not be ensured in situations with a large amount of distortion. In order to improve the overall accuracy of the correction, a precise locating process of the correction pattern is further provided based on this embodiment. As shown in FIG. 7, the precise locating process may comprise the following steps:

detecting, in a predetermined area along a first direction, a first line segment having a length ratio of white:black:white meeting a predetermined ratio, and determining the central point of the black portion of the first line segment;

taking the central point of the black portion of the first line segment as a reference location to obtain a second detection line perpendicular to the first line segment, detecting along the second detection line a second line segment having a length ratio of white:black:white meeting the predetermined ratio, and taking the central point of the black portion of the second line segment as the central point of the correction pattern.

Because a correction pattern is a square containing 5×5 modules, preferably, the predetermined area includes at least 64 modules. If a correction pattern cannot be detected in the predetermined area of 64 modules, the predetermined area is expanded to an area including 256 modules or even an area including 1024 modules. A selection of the predetermined area may be detected according to the above steps from a smaller area to a larger area, or a square region can be specified separately without expanded detection.

The predetermined ratio allows a range of error based on a ratio of 1:1:1. In this embodiment, the predetermined ratio is such configured that the sum of lengths of the white sections and the black section is from 0.7 L to 1.3 L, wherein L is the length of three modules, and the lengths of the white section and the black section are both less than or equal to the length of 2 modules. That is, the length of each white section and the length of each black section in the white:black:white pattern should not be larger than the length of 2 modules, and the total length of the white:black:white pattern is between 2.1 modules to 3.9 modules. If there is a white section, a black section or a white:black:white pattern exceeding the above limits, it is considered that the predetermined ratio is not satisfied.

In this embodiment, preferably, locating the correction pattern precisely to obtain coordinates of the central point of the correction pattern further comprises the following steps:

taking the central point of the black section of the second line segment as a reference location, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the step of detecting in the predetermined area along the first direction.

taking the central point of the black section of the second line segment as a reference location, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the step of detecting in the predetermined area in the first direction.

The central point of the black section of the second line segment is obtained after the above detection. It is confirmed only in theory that the central point of the black section of the second line segment is the central point of the correction pattern, and it is actually verified in the second direction, however, without verifying whether the condition of a length ratio of white:black:white meeting the predetermined ratio is satisfied in the first direction. This will probably cause detection errors. In order to prevent such situations, the above detection step is added. Fast detection may be realized on the correction pattern of the QR code image while ensuring the accuracy of the detection to a certain extent, with a lower rate of detection errors, and thus an improved overall correction effect and speed.

The core concept of the detection of the correction pattern lies in that the coordinates of the correction pattern is at first roughly estimated according to the detected coordinates of the detection patterns and different QR code versions, then a square region is specified around the coordinates of the correction pattern as a predetermined area, in which a search is performed repeatedly. Finally, in conjunction with the characteristic of the correction pattern itself, i.e., having a line segment meeting a predetermined ratio, the correction pattern may be accurately located in the predetermined area, without the need of searching patterns meeting a 1:1:1 ratio row by row in the entire QR code image. As a result, resources may be integrated and optimized effectively, and the amount of detection may be greatly reduced, enabling the fast and efficient detection of the correction pattern while ensuring the precision and accuracy of the detection.

Because it is necessary to substitute another point for the correction pattern in the case of version 1 or when the correction pattern cannot be detected successfully, taking this into account, a point on the lower right corner may substitute for the correction pattern in this embodiment.

Note that when the correction pattern may be detected successfully, it is not required to use the coordinates of a point on the lower right corner as a substitution. Thus, coordinates of three detection patterns and a locating point may be obtained, after which conversion coefficients may be obtained through a perspective transformation. This embodiment takes full advantage of the characteristic of the detection patterns and the correction pattern themselves and the location relationship therebetween to greatly save detection steps, resulting in a simplified detection procedure and improved computing speed, so that fast detection may be realized for the detection patterns and correction pattern of the QR code image, at the same time, the correction speed of the QR code image may be improved accordingly.

The process of obtaining coordinates of the central point of each detection pattern and a locating point in the correction coordinate system comprises:

determining coordinates of the central point of the detection pattern in the correction coordinate system, according to the number of modules in a standard QR code image between the central point of each detection pattern and an edge of the QR code image;

determining coordinates of the central point of the correction pattern in the correction coordinate system, according to the number of modules in a standard QR code image between the central point of the correction pattern and an edge of the QR code image.

Thus, coordinates of the central point of each detection pattern and correction pattern in the initial coordination system and the correction coordinate system may be obtained, and the correction of the QR code image may be realized according to the method of embodiment 2.

Embodiment 3

Figure 8:
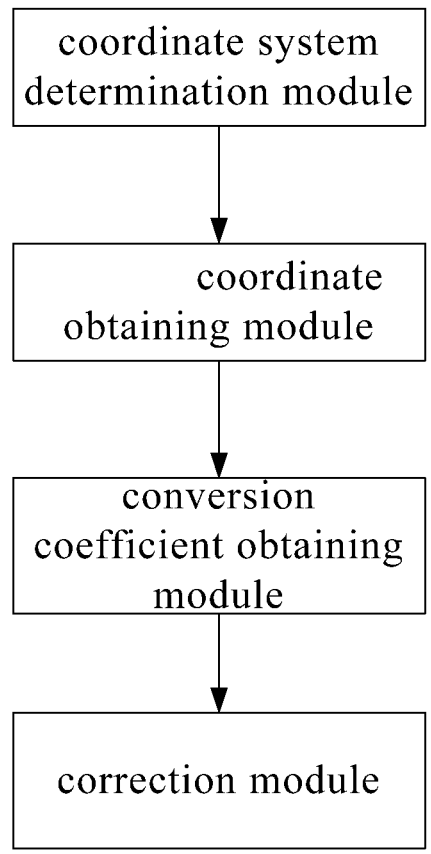
FIG. 8 is a structural diagram of a system for correcting a QR code image according to an embodiment.

A system for correcting a QR code image is provided in this embodiment, which as shown in FIG. 8 comprises:

a coordinate system determination module, for determining an initial coordination system where the QR code image locates and a correction coordination system where a corrected image locates, wherein each point in the correction coordination system corresponds to a point in the initial coordination system;

a coordinate obtaining module, for obtaining coordinates of a central point of each detection pattern and a locating point in the initial coordinate system and the correction coordinate system respectively;

a conversion coefficient obtaining module, for obtaining conversion coefficients according to the coordinates of the central point of each detection pattern and the coordinates of the locating point in the initial coordinate system and the correction coordinate system;

a correction module, for finding out, for each point in the correction coordinate system, a module of the QR code image in which its corresponding point in the initial coordinate system locates according to the conversion coefficients, and assigning the grayscale value of that module to the point to realize the correction of the QR code image.

As well known, the decoding process of a QR code image is performed based on a standard code image. The purpose of correcting a QR code image is to correct an image with a certain degree of skewing, damage, or distortion to obtain a standard code image and make sure that a later decoding process may be performed on the entire QR code image successfully. Thus, in the correction of the QR code image in this embodiment, first of all, two coordinate systems are determined.

An initial coordinate system where the QR code image locates is shown in FIG. 2, through detecting in this image, coordinates of a corresponding point may be obtained. FIG. 3 shows a correction coordinate system where a corrected image locates, wherein each square represents a point, and not all the points are shown in this figure, wherein the number of points is equal to the number of modules in the QR code image. In the two figures, 0 corresponds to a detection pattern on the upper left corner, 1 corresponds to a detection pattern on the upper right corner, 2 corresponds to a locating point, and 3 corresponds to a detection pattern on the lower left corner. As shown in FIG. 3, after the QR code is corrected, the centre of the detection pattern on the upper left corner is separate from the upper edge of the QR code by 4 modules and from the left edge by 4 modules. Thus, a point on row 4 column 4 in the correction coordinate system corresponds to the central point of the upper left detection pattern of the QR code image in the initial coordinate system. If the grayscale value of this point is 0, the grayscale value of the point on row 4 column 4 in the correction coordinate system is also 0; if the grayscale value of this point is 255, the grayscale value of the point on row 4 column 4 in the correction coordinate system is also 255. In this embodiment, the central point of the detection pattern must be black, and thus the corresponding point on row 4 column 4 in the correction coordinate system is also black. And so on, a grayscale value may be obtained for each point in the correction coordinate system according to the above operation, after which a corrected QR code image shown in FIG. 4 is obtained.

Steps of deriving conversion coefficients will be particularly described with equations below. Assume that the coordinates of three detection patterns and a locating point before the correction are $P0(X_A,Y_A)$, $P1(X_B,Y_B)$, $P2(X_C,Y_C)$, $P3(x3p,y3p)$, and coordinates of the three detection patterns and the locating point after the correction are $A0(x0,y0)$, $A1(x1,y1)$, $A2(x2,y2)$, $A3(x3,y3)$.

Coefficients are calculated according to the coordinates of the three detection patterns and the locating point after the correction:

$$dy2=y3-y2$$

$$dy3=y0-y1+y2-y3$$

If $dy2=0$ and $dy3=0$

In this situation:

$$\begin{cases} a_{11} = x1 - x0 \\ a_{21} = x2 - x1 \\ a_{31} = x0 \\ a_{12} = y1 - y0 \\ a_{22} = y2 - y1 \\ a_{32} = y0 \\ a_{13} = 0 \\ a_{23} = 0 \\ a_{33} = 1 \end{cases}$$

Otherwise:

$$\begin{cases} a_{11} = x1 - x0 + a_{13}x1 \\ a_{21} = x3 - x0 + a_{23}x3 \\ a_{31} = x0 \\ a_{12} = y1 - y0 + a_{13}y1 \\ a_{22} = y2 - y1 + a_{23}y3 \\ a_{32} = y0 \\ a_{13} = a_{31} \\ a_{23} = a_{32} \\ a_{33} = 1 \end{cases}$$

Wherein:

$$dx1 = x1 - x2$$

$$dx2 = x3 - x2$$

$$dx3 = x0 - x1 + x2 - x3$$

$$dy1 = y1 - y2$$

$$a13 = \frac{dx3 \cdot dy2 - dx2 \cdot dy3}{dx1 \cdot dy2 - dx2 \cdot dy1}$$

$$a31 = \frac{dx1 \cdot dy3 - dx3 \cdot dy1}{dx1 \cdot dy2 - dx2 \cdot dy1}$$

Similarly, according to the above equations, corresponding coefficients $b_{11}$, $b_{21}$, $b_{31}$, $b_{12}$, $b_{22}$, $b_{32}$, $b_{13}$, $b_{23}$, $b_{33}$ may be derived by substituting the coordinates of the three detection patterns and the locating point before the correction into the above equations.

$$\begin{cases} b'_{11} = b_{22} \cdot b_{33} - b_{23} \cdot b_{32} \\ b'_{21} = b_{23} \cdot b_{31} - b_{21} \cdot b_{33} \\ b'_{31} = b_{21} \cdot b_{32} - b_{22} \cdot b_{31} \\ b'_{12} = b_{13} \cdot b_{32} - b_{12} \cdot b_{33} \\ b'_{22} = b_{11} \cdot b_{33} - b_{13} \cdot b_{31} \\ b'_{32} = b_{12} \cdot b_{31} - b_{11} \cdot b_{32} \\ b'_{13} = b_{12} \cdot b_{23} - b_{13} \cdot b_{22} \\ b'_{23} = b_{13} \cdot b_{21} - b_{11} \cdot b_{23} \\ b'_{33} = b_{11} \cdot b_{22} - b_{12} \cdot b_{21} \end{cases}$$

Finally, conversion coefficient C between the images before and after the conversion are calculated from the two sets of parameters $a_{11}, a_{21}, \ldots, a_{33}$ and $b_{11}', b_{21}', \ldots, b_{33}'$:

$$C = \begin{pmatrix} c_{11} & c_{12} & c_{13} \\ c_{21} & c_{22} & c_{23} \\ c_{31} & c_{32} & c_{33} \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} b'_{11} & b'_{12} & b'_{13} \\ b'_{21} & b'_{22} & b'_{23} \\ b'_{31} & b'_{32} & b'_{33} \end{pmatrix}$$

Given that each row and each column of the QR code both contains n modules, the correction coordinate system comprises n×n points. For the $i^{th}$ point $P_i(x_i,y_i)$, coordinates of a point corresponding to this point in the original image may be calculated with the following equations:

$$x'_i = \frac{c_{11}x_i + c_{21}y_i + c_{31}}{c_{13}x_i + c_{23}y_i + c_{33}}$$

$$y'_i = \frac{c_{12}x_i + c_{22}y_i + c_{32}}{c_{13}x_i + c_{23}y_i + c_{33}}$$

By assigning each module's grayscale value in the initial coordinate system to the correction coordinate system correspondingly, the correction process may be realized. FIG. 4 shows an effect diagram after correction and assignment. In the step of obtaining a corrected result, the grayscale value of a module is the grayscale value of a central pixel of the module. In order to further reduce the amount of computation, in the acquisition of the grayscale value of a module, the pixel value of the central point of the module may be directly used as the grayscale value of the module. Because each module is the smallest image unit in a QR code image, which has a very small size with respect to the entire QR code image, and very small difference in grayscale values of all pixels contained therein, selecting the pixel value of a pixel therein as a representative will introduce no errors, which may still ensure the accuracy of the correction, greatly lower the amount of computation, and improve correction efficiency.

The locating point of this embodiment may be the central point of a correction pattern or a point on the lower right corner. In case the locating point is at the lower right corner, a point corresponding to virtual detection patterns is selected. A point corresponding to virtual detection patterns means a point meeting the following conditions: its horizontal distance to the lower left detection pattern is equal to the horizontal distance between the upper right detection pattern and the upper left detection pattern; its vertical distance to the upper right detection pattern is equal to the vertical distance between the lower left detection pattern and the upper left detection pattern.

The locating point is preferably the central point of a correction pattern. Because some QR code image versions do not have a correction pattern provided, such as QR code images of version 1. In other situations, for example, serious distortions may cause the absence of a correction pattern, or the correction pattern cannot be detected successfully as limited by the detection technique employed. Replacing the correction pattern by a point on the lower right corner may achieve a good detection effect.

The method for correcting QR code image of this embodiment does not need edge detection, and may obtain conversion coefficients directly using three detection patterns and a locating point. Because the detection patterns and the locating point may be detected using relatively mature detection techniques with high detection accuracy, coordinates of the three detection patterns and the locating point in the initial coordination system and the correction coordinate system may be readily obtained according to different version numbers. Shortcomings caused by edge detection algorithm may be avoided appropriately, and a favourable correction effect may be obtained.

Embodiment 4

Figure 9:
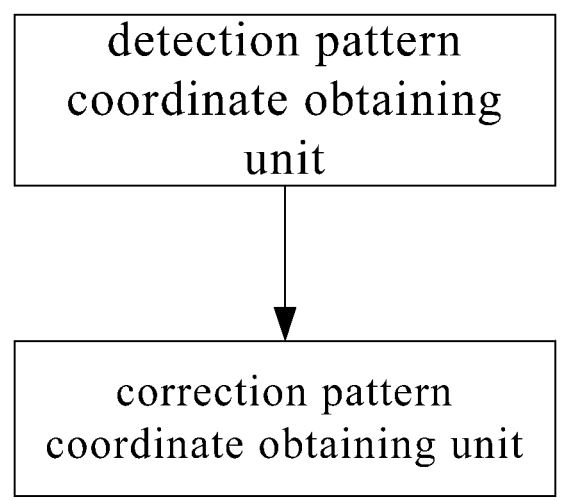
FIG. 9 is a structural diagram of the coordinate obtaining module according to an embodiment.

This embodiment comprises improvements based on embodiment 3, as shown in FIG. 9, the coordinate obtaining module comprises:

a detection pattern coordinate obtaining unit, for determining coordinates of the central point of each detection pattern in the initial coordination system;

a correction pattern coordinate obtaining unit, for obtaining coordinates of the central point of the correction pattern in the initial coordination system, according to the relative location relationship between the central point of the correction pattern and the central points of the detection patterns.

Because QR code images are shot with short object distances, an apparent perspective phenomenon may be observed. Thus, a perspective transformation must be performed on a photographed QR code image. The so-called perspective transformation means converting each coordinate of the QR code image from a current coordinate system to a correction coordinate system and obtain corrected coordinates. It is necessary to obtain precise perspective conversion coefficients to realize the perspective transformation process. Conversion coefficients may be obtained in this embodiment by calculation based on the detection patterns and the correction pattern that are detected appropriately. Different from the calculation in the prior art in which four points on the edges of the QR code image are used, the problem of low correction accuracy caused by edge detection may be avoided.

Figure 10:
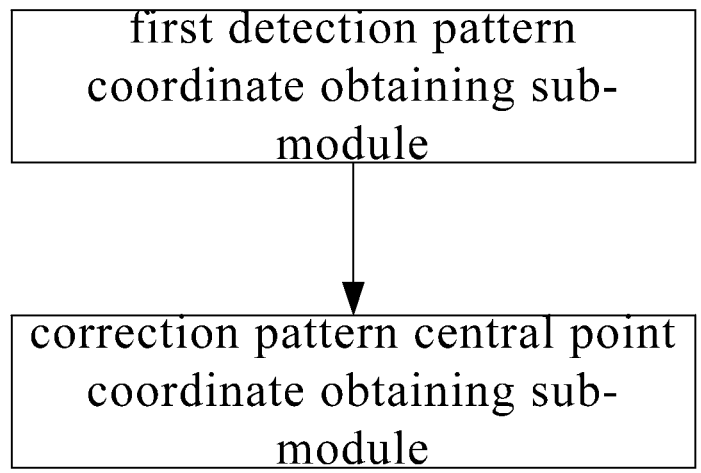
FIG. 10 is a structural diagram of the correction pattern coordinate obtaining unit according to an embodiment.

As shown in FIG. 10, the correction pattern coordinate obtaining unit comprises:

a first detection pattern coordinate obtaining sub-module, for obtaining coordinates $(X_A, Y_A)$ of the central point of a first detection pattern in the initial coordination system;

a correction pattern central point coordinate obtaining sub-module, for obtaining a horizontal coordinate of the central point of the correction pattern, according to the horizontal distance between central point of the correction pattern and the central point of the first detection pattern; obtaining a vertical coordinate of the central point of the correction pattern, according to the vertical distance between central point of the correction pattern and the central point of the first detection pattern.

Figure 11:
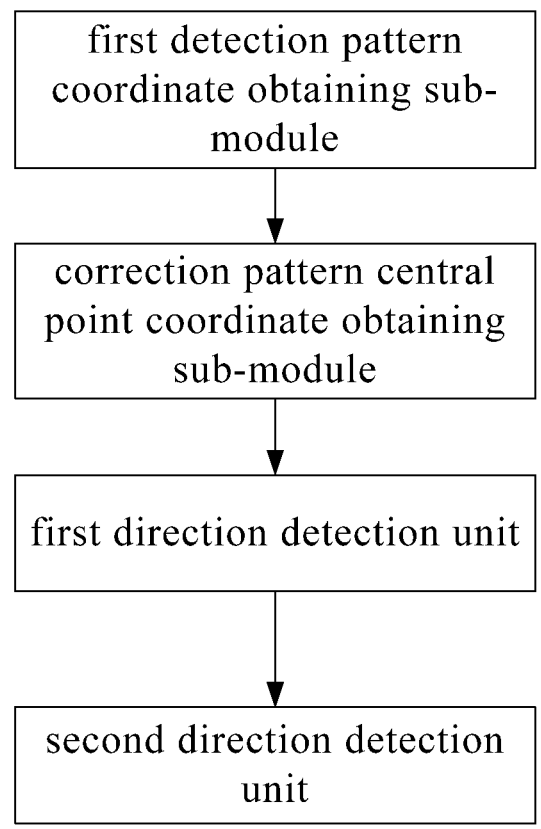
FIG. 11 is a structural diagram of the precise locating module according to an embodiment.

The horizontal coordinate and the vertical coordinate are determined in the correction pattern central point coordinate obtaining sub-unit according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/N$, N is the number of modules contained in the QR code in the horizontal or vertical direction. Thereby, the horizontal coordinate of the central point of the correction pattern is $X_A + \epsilon_h$, and the vertical coordinate of the central point of the correction pattern is $Y_A + \epsilon_z$. However, the accuracy of the coordinates of the correction pattern may not be ensured in situations with a large amount of distortion. In order to improve the overall accuracy of the correction, a precise locating process of the correction pattern is further provided based on this embodiment. As shown in FIG. 11, the precise locating module comprises:

a first direction detecting unit, for detecting, in a predetermined area along a first direction, a first line segment having a length ratio of white:black:white meeting a predetermined ratio, and determining the central point of the black portion of the first line segment;

a second direction detecting unit, taking the central point of the black portion of the first line segment as a reference location to obtain a second detection line perpendicular to the first line segment, detecting along the second detection line a second line segment having a length ratio of white:black:white meeting the predetermined ratio, and taking the central point of the black portion of the second line segment as the central point of the correction pattern.

Because a correction pattern is a square containing 5×5 modules, preferably, the predetermined area includes at least 64 modules. If a correction pattern cannot be detected in the predetermined area of 64 modules, the predetermined area is expanded to an area including 256 modules or even an area including 1024 modules. A selection of the predetermined area may be detected according to the above steps from a smaller area to a larger area, or a square region can be specified separately without expanded detection.

The predetermined ratio allows a range of error based on a ratio of 1:1:1. In this embodiment, the predetermined ratio is such configured that the sum of lengths of the white sections and the black section is from 0.7 L to 1.3 L, wherein L is the length of three modules, and the lengths of the white section and the black section are both less than or equal to the length of 2 modules. That is, the length of each white section and the length of each black section in the white:black:white pattern should not be larger than the length of 2 modules, and the total length of the white:black:white pattern is between 2.1 modules to 3.9 modules. If there is a white section, a black section or a white:black:white pattern exceeding the above limits, it is considered that the predetermined ratio is not satisfied.

In this embodiment, preferably, the precise locating module further comprises:

a comparison and determination unit, for taking the central point of the black section of the second line segment as a reference location, obtaining a third detection line perpendicular to the second line segment; detecting on the third detection line a third line segment having a length ratio of white:black:white meeting the predetermined ratio, wherein if the third line segment is detected, the central point of the black section of the second line segment is the central point of the correction pattern; otherwise, the process returns to the step of detecting in the predetermined area along the first direction.

a diagonal detection unit, for taking the central point of the black section of the second line segment as a reference location, obtaining a fourth detection line at +45 degree or −45 degree with respect to the first direction; detecting on the fourth detection line a fourth line segment having a length ratio of white:black:white meeting a predetermined ratio; wherein if the fourth line segment is detected, the central point of the black section of the second line segment is the central point of the correction pattern; otherwise, the process returns to the step of detecting in the predetermined area in the first direction.

After the operations of the first direction detecting unit and the second direction detecting unit, it is merely determined in theory that the central point of the black section of the second line segment is the central point of the correction pattern, and the above detection step may provide further verification. The correction pattern of the QR code image may be detected rapidly while ensuring the accuracy of the detection to a certain extent, with a lower rate of detection errors, and thus an improved overall correction effect and speed.

The core concept of the detection of the correction pattern lies in that the coordinates of the correction pattern is at first roughly estimated according to the detected coordinates of the detection patterns and different QR code versions, then a square region is specified around the coordinates of the correction pattern as a predetermined area, in which a search is performed repeatedly. Finally, in conjunction with the characteristic of the correction pattern itself, i.e., having a line segment meeting a predetermined ratio, the correction pattern may be accurately located in the predetermined area, without the need of searching patterns meeting a 1:1:1 ratio row by row in the entire QR code image. As a result, resources may be integrated and optimized effectively, and the amount of detection may be greatly reduced, enabling the fast and efficient detection of the correction pattern while ensuring the precision and accuracy of the detection.

Because it is necessary to substitute another point for the correction pattern in the case of version 1 or when the correction pattern cannot be detected successfully, taking this into account, a point on the lower right corner may substitute for the correction pattern in this embodiment.

Note that when the correction pattern may be detected successfully, it is not required to use the coordinates of a point on the lower right corner as a substitution. Thus, coordinates of three detection patterns and a locating point may be obtained, after which conversion coefficients may be obtained through a perspective transformation. This embodiment takes full advantage of the characteristic of the detection patterns and the correction pattern themselves and the location relationship therebetween to greatly save detection steps, resulting in a simplified detection procedure and improved computing speed, so that fast detection may be realized for the detection patterns and correction pattern of the QR code image, at the same time, the correction speed of the QR code image may be improved accordingly.

The correction pattern coordinate obtaining unit comprises:

a detection pattern correction coordinate obtaining submodule, for determining coordinates of the central point of the detection pattern in the correction coordinate system, according to the number of modules in a standard QR code image between the central point of each detection pattern and an edge of the QR code image;

a correction pattern correction coordinate obtaining submodule, for determining coordinates of the central point of the correction pattern in the correction coordinate system, according to the number of modules in a standard QR code image between the central point of the correction pattern and an edge of the QR code image.

Thus, coordinates of the central point of each detection pattern and a correction pattern in the initial coordinate system and the correction coordinate system may be obtained, and the correction of the QR code image may be realized according to the system of embodiment 1.

A person skilled in the art should appreciate that the examples of the present application may be provided as method, system, or a computer program product. Therefore, the present application may take the form of completely hardware examples, completely software examples, or hardware and software combined examples. Moreover, the present application may adopt the form of a computer program product implemented on one or more computer readable storage medium (including but not limited to a disk storage, a CD-ROM, an optical disk, etc) containing computer usable program products.

The present application is described with reference to the flowcharts and/or block diagrams of the method, apparatus (system) and computer program product of the examples of the present invention. It should be understood that a computer program instruction is used to implement each flow and/or block in the flowcharts and/or block diagrams, and combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the steps for implementing the functions specified in one or more flows in the flowchart and/or one or more blocks in the block diagram.

Figure 12:
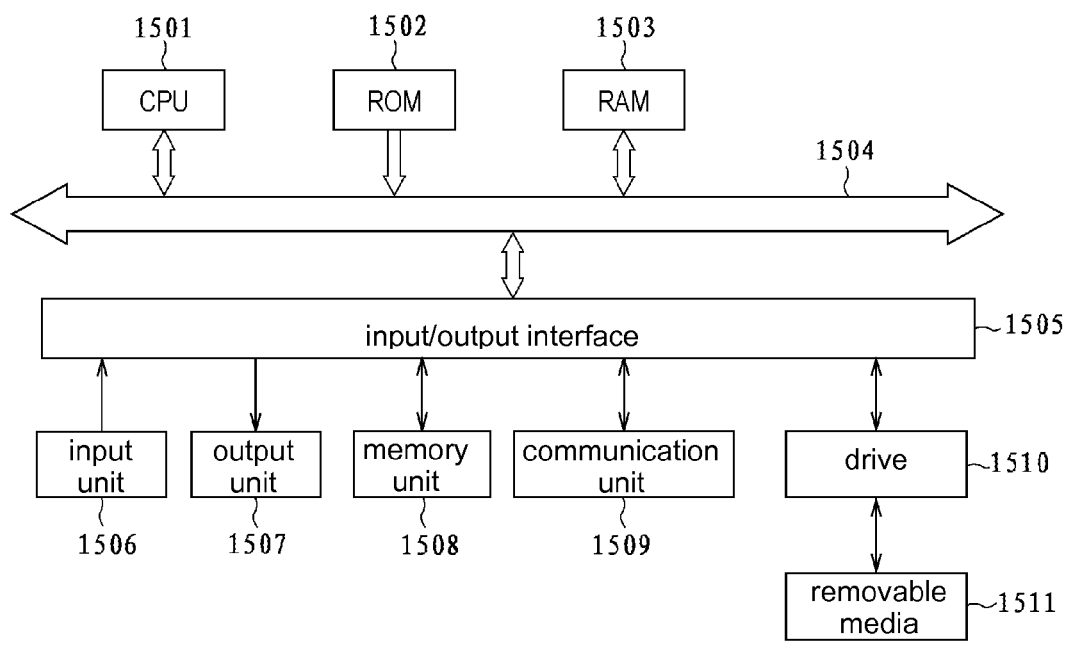
FIG. 12 shows a block diagram of an example of the structure of a computer.

FIG. 12 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

Although the preferred examples of the present application have been described, a person skilled in the art, once obtaining the basic inventive concept, can make additional variations and modifications to these examples. Therefore, the attached claims are intended to be interpreted as including the preferred examples and all variations and modifications falling into the scope of the present application.

What is claimed is:

1. A method for correcting a QR code image, the method comprising:
    determining an initial coordination system where the QR code image locates and a correction coordination system where a corrected image locates, wherein each point in the correction coordination system corresponds to a point in the initial coordination system;
    obtaining coordinates of a central point of each detection pattern and a locating point in the initial coordinate system and the correction coordinate system respectively;
    obtaining conversion coefficients according to the coordinates of the central point of each detection pattern and the coordinates of the locating point in the initial coordinate system and the correction coordinate system;
    finding out, for each point in the correction coordinate system, a module of the QR code image in which its corresponding point in the initial coordinate system locates according to the conversion coefficients, and assigning the grayscale value of that module to the point to realize the correction of the QR code image,
    wherein the central point of a correction pattern is selected as the locating point.

2. The method of claim 1 in the process of finding out, for each point in the correction coordinate system, a module of the QR code image in which its corresponding point in the initial coordinate system locates according to the conversion coefficients, and assigning the grayscale value of that module to the point to realize the correction of the QR code image:
    the grayscale value of the module is the grayscale value of the central pixel of the module.

3. The method of claim 1 wherein in the process of obtaining conversion coefficients according to the coordinates of the central point of each detection pattern and the coordinates of the locating point in the initial coordinate system and the correction coordinate system:
    the conversion coefficients are obtained following a rule of perspective transformation.

4. The method of claim 1 wherein the process of obtaining coordinates of the central point of each detection pattern and the locating point in the initial coordinate system comprises:
    determining coordinates of the central point of each detection pattern in the initial coordination system;
    obtaining coordinates of the central point of the correction pattern in the initial coordination system, according to the relative location relationship between the central point of the correction pattern and the central points of the detection patterns.

5. The method of claim 1 wherein the process of obtaining reference coordinates of the central point of the correction pattern in the initial coordination system according to the relative location relationship between the central point of the correction pattern and the central points of the detection patterns comprises:
    obtaining coordinates $(X_A, Y_A)$ of the central point of a first detection pattern in the initial coordination system;
    obtaining a horizontal coordinate of the central point of the correction pattern, according to the horizontal distance between central point of the correction pattern and the central point of the first detection pattern; obtaining a vertical coordinate of the central point of the correction pattern, according to the vertical distance between central point of the correction pattern and the central point of the first detection pattern.

6. The method of claim 5 wherein the horizontal distance and the vertical distance are determined according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/N$, N is the number of modules contained in the QR code in the horizontal or vertical direction.

7. The method of claim 1 wherein the process of obtaining coordinates of the central point of each detection pattern and the locating point in the correction coordinate system comprises:
    determining coordinates of the central point of the detection pattern in the correction coordinate system, according to the number of modules in a standard QR code image between the central point of each detection pattern and an edge of the QR code image;
    determining coordinates of the central point of the correction pattern in the correction coordinate system, according to the number of modules in a standard QR code image between the central point of the correction pattern and an edge of the QR code image.

8. A system for correcting a QR code image, the system comprising:
    a coordinate system determination module, for determining an initial coordination system where the QR code image locates and a correction coordination system where a corrected image locates, wherein each point in the correction coordination system corresponds to a point in the initial coordination system;
    a coordinate obtaining module, for obtaining coordinates of a central point of each detection pattern and a locating point in the initial coordinate system and the correction coordinate system respectively;
    a conversion coefficient obtaining module, for obtaining conversion coefficients according to the coordinates of the central point of each detection pattern and the coordinates of the locating point in the initial coordinate system and the correction coordinate system;
    a correction module, for finding out, for each point in the correction coordinate system, a module of the QR code image in which its corresponding point in the initial coordinate system locates according to the conversion coefficients, and assigning the grayscale value of that module to the point to realize the correction of the QR code image, wherein, in the coordinate obtaining module, the central point of a correction pattern is selected as the locating point.

9. The system of claim 8 wherein the correction module is configured to set the grayscale value of the module as the grayscale value of the central pixel of the module.

10. The system of claim 8 wherein in the conversion coefficient obtaining module, the conversion coefficients are obtained following a rule of perspective transformation.

11. The system of claim 10 wherein the coordinate obtaining module comprises:
a detection pattern coordinate obtaining unit, for determining coordinates of the central point of each detection pattern in the initial coordination system;
a correction pattern coordinate obtaining unit, for obtaining coordinates of the central point of the correction pattern in the initial coordination system, according to the relative location relationship between the central point of the correction pattern and the central points of the detection patterns.

12. The system of claim 8 wherein the detection pattern coordinate obtaining unit comprises:
a first detection pattern coordinate obtaining sub-module, for obtaining coordinates $(X_A, Y_A)$ of the central point of a first detection pattern in the initial coordination system;
a correction pattern central point coordinate obtaining sub-module, for obtaining a horizontal coordinate of the central point of the correction pattern, according to the horizontal distance between central point of the correction pattern and the central point of the first detection pattern; obtaining a vertical coordinate of the central point of the correction pattern, according to the vertical distance between central point of the correction pattern and the central point of the first detection pattern.

13. The system of claim 12 wherein the correction pattern central point coordinate obtaining sub-module determines the horizontal coordinate and the vertical coordinate according to the following equations:

the horizontal distance is $\epsilon_h = \epsilon(X_R - X_A)$ the vertical distance is $\epsilon_z = \epsilon(Y_R - Y_A)$ wherein, $X_R = X_B - X_A + X_C$, $Y_R = Y_B - Y_A + Y_C$, $(X_B, Y_B)$ is the coordinates of the central point of the second detection pattern; $(X_C, Y_C)$ is the coordinates of the central point of the third detection pattern; $\epsilon$ is an offset factor of the correction pattern, and $\epsilon = (N-3)/N$, N is the number of modules contained in the QR code in the horizontal or vertical direction.

14. The system of claim 8 wherein the correction pattern coordinate obtaining unit further comprises:
a detection pattern correction coordinate obtaining sub-module, for determining coordinates of the central point of the detection pattern in the correction coordinate system, according to the number of modules in a standard QR code image between the central point of each detection pattern and an edge of the QR code image;
a correction pattern correction coordinate obtaining sub-module, for determining coordinates of the central point of the correction pattern in the correction coordinate system, according to the number of modules in a standard QR code image between the central point of the correction pattern and an edge of the QR code image.

15. A system for correcting a QR code image, the system comprising:
a processor, wherein the processor is configured to:
determining an initial coordination system where the QR code image locates and a correction coordination system where a corrected image locates, wherein each point in the correction coordination system corresponds to a point in the initial coordination system;
obtaining coordinates of a central point of each detection pattern and a locating point in the initial coordinate system and the correction coordinate system respectively;
obtaining conversion coefficients according to the coordinates of the central point of each detection pattern and the coordinates of the locating point in the initial coordinate system and the correction coordinate system;
finding out, for each point in the correction coordinate system, a module of the QR code image in which its corresponding point in the initial coordinate system locates according to the conversion coefficients, and assigning the grayscale value of that module to the point to realize the correction of the QR code image,
wherein the central point of a correction pattern is selected as the locating point.

* * * * *